United States Patent [19]
Nakano

[11] Patent Number: 6,124,892
[45] Date of Patent: Sep. 26, 2000

[54] PANHEAD DEVICE FOR MOVABLY SUPPORTING AN APPARATUS

[75] Inventor: Hirofumi Nakano, Yokohama, Japan

[73] Assignee: Canon Kabushiki Kaisha, Tokyo, Japan

[21] Appl. No.: 08/814,447

[22] Filed: Mar. 10, 1997

[30] Foreign Application Priority Data

Mar. 15, 1996 [JP] Japan .................................. 8-058974
Dec. 25, 1996 [JP] Japan .................................. 8-345696

[51] Int. Cl.⁷ .................................................. H04N 5/225
[52] U.S. Cl. ............................................................. 348/373
[58] Field of Search .................................. 348/373, 374, 348/375, 211, 151; 396/419, 429, 427, 428; 248/133, 370, 371, 417, 278.1

[56] References Cited

U.S. PATENT DOCUMENTS

| | | | |
|---|---|---|---|
| 3,739,703 | 6/1973 | Behles ..................................... | 396/427 |
| 3,916,097 | 10/1975 | Imai ........................................ | 348/151 |
| 4,080,629 | 3/1978 | Hammond et al. ...................... | 348/143 |
| 4,217,606 | 8/1980 | Nordmann .............................. | 348/151 |
| 4,320,949 | 3/1982 | Pagano ................................... | 348/143 |
| 4,653,709 | 3/1987 | Paldino .................................. | 396/428 |
| 4,794,417 | 12/1988 | Sekiguchi et al. ..................... | 348/143 |
| 4,833,534 | 5/1989 | Paff et al. .............................. | 348/151 |
| 4,945,367 | 7/1990 | Blackshear ............................. | 348/143 |
| 5,028,997 | 7/1991 | Elberbaum .............................. | 348/143 |
| 5,181,120 | 1/1993 | Hickey et al. .......................... | 348/373 |
| 5,394,209 | 2/1995 | Stiepel et al. .......................... | 348/151 |
| 5,564,812 | 10/1996 | Berardi .................................... | 362/23 |
| 5,627,616 | 5/1997 | Sergeant et al. ....................... | 348/143 |
| 5,633,681 | 5/1997 | Baxter et al. ........................... | 348/373 |
| 5,742,859 | 4/1998 | Acker ..................................... | 396/428 |
| 5,852,754 | 12/1998 | Schneider ................................ | 348/143 |
| 5,883,697 | 3/1999 | Ohyama .................................. | 355/18 |

*Primary Examiner*—Wendy Garber
*Assistant Examiner*—Aung S. Moe
*Attorney, Agent, or Firm*—Robin, Blecker & Daley

[57] ABSTRACT

A panhead device includes a base, a support mount which is movably supported by the base to place a camera thereon, a driving mechanism for driving the support mount in at least one of a panning direction and a tilting direction, a controller for controlling the driving mechanism to cause the support mount to be moved in a predetermined direction, and a clutch mechanism, disposed inside the driving mechanism, for transmitting and blocking a driving force.

14 Claims, 15 Drawing Sheets

PANHEAD DEVICE FOR MOVABLY SUPPORTING AN APPARATUS

BACKGROUND OF THE INVENTION

1. Field of the Invention

This invention relates to a panhead device for movably supporting an equipment or an apparatus such as a video camera or the like, and more particularly to such a panhead device that is arranged to be driven by power.

2. Description of Related Art

In performing a shooting operation with a video camera or the like, a panhead device of the above-stated kind permits a remote operation on the video camera which is mounted on the panhead device. For that purpose, there is known a motor-driven panhead, which is provided with a camera mount on which a video camera can be mounted through a camera screw for a tripod, a mechanism arranged to pan and tilt the camera mount with a motor serving as a drive source, and a control mechanism using a reflecting pattern and a photo-interrupter.

The use of the motor-driven panhead enables a remote controller to carry out remote operations such as panning and tilting. It permits also a simple automatic operation by which panning can be automatically made within a predetermined range of angles.

The conventional motor-driven panhead, however, has presented the following problems. The conventional motor-driven panhead does not permit not only manual panning but also manual tilting. Besides, it is difficult to effectively carry out fine control over panning and tilting operations on the panhead.

BRIEF SUMMARY OF THE INVENTION

This invention has been developed in view of the above-stated problems of the prior art. Therefore, it is an object of this invention to provide a panhead device which is arranged to permit not only manual operations but also fine and accurate control in an improved manner.

To attain the above object, in accordance with one aspect of this invention, there is provided a panhead device, which comprises a base, a support mount which is movably supported by the base to place a camera thereon, driving means for driving the support mount in at least one of a panning direction and a tilting direction, control means for controlling the driving means to cause the support mount to be moved in a predetermined direction, and clutch means, disposed inside the driving means, for transmitting and blocking a driving force.

To attain the above object, in accordance with another aspect of this invention, there is provided a panhead device, which comprises a base, a support mount which is movably supported by the base to place a camera thereon, driving means, having a motor, for driving the support mount in at least one of a panning direction and a tilting direction, and control means for controlling the driving means to cause the support mount to be moved in a predetermined direction, wherein the control means breaks a current flowing to the motor when torque having a magnitude greater than a predetermined value is transmitted to the motor from the support mount.

The above and other objects and features of this invention will become apparent from the following detailed description of embodiments thereof taken in connection with the accompanying drawings.

BRIEF DESCRIPTION OF THE SEVERAL VIEWS OF DRAWING

Figure 5A:
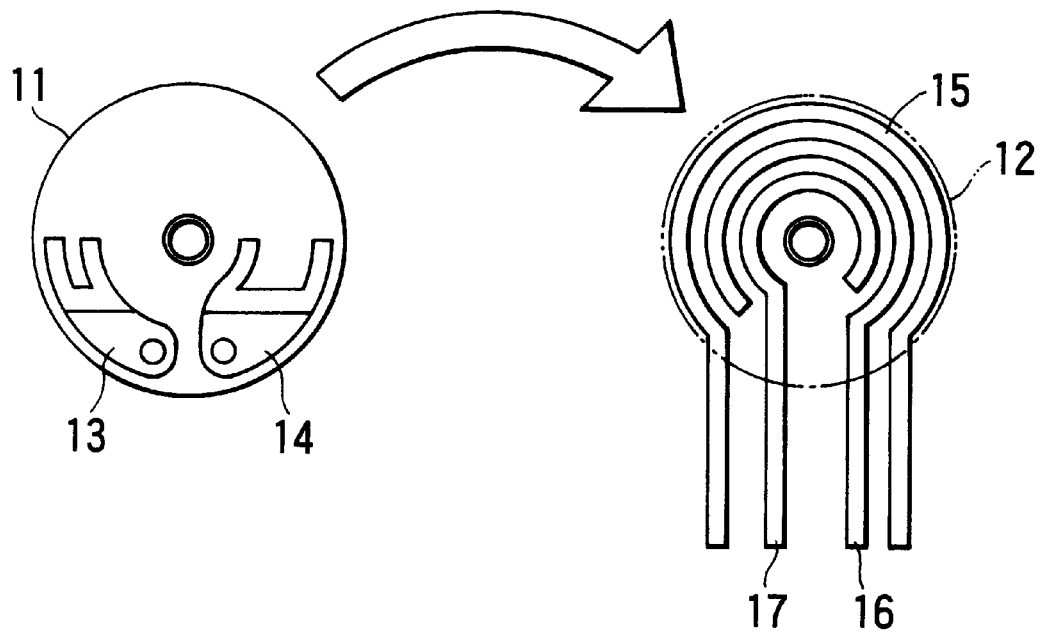
Figure 5B:
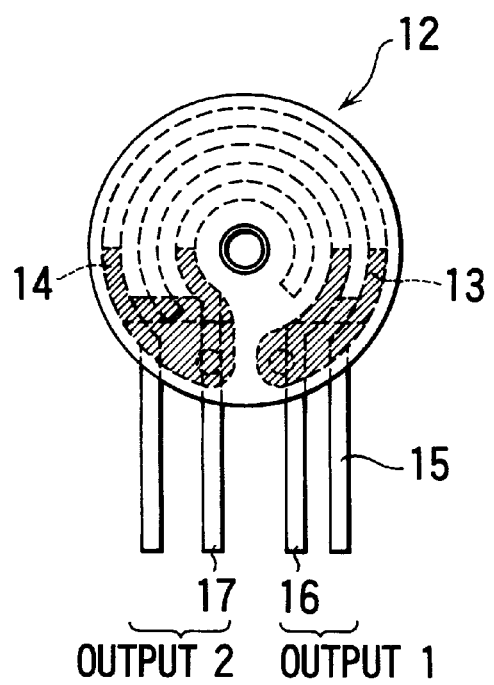

FIGS. 5(A) and 5(B) show an example of the structure of a volume encoder in the panhead device in this invention.

Figures 6A, 6B:
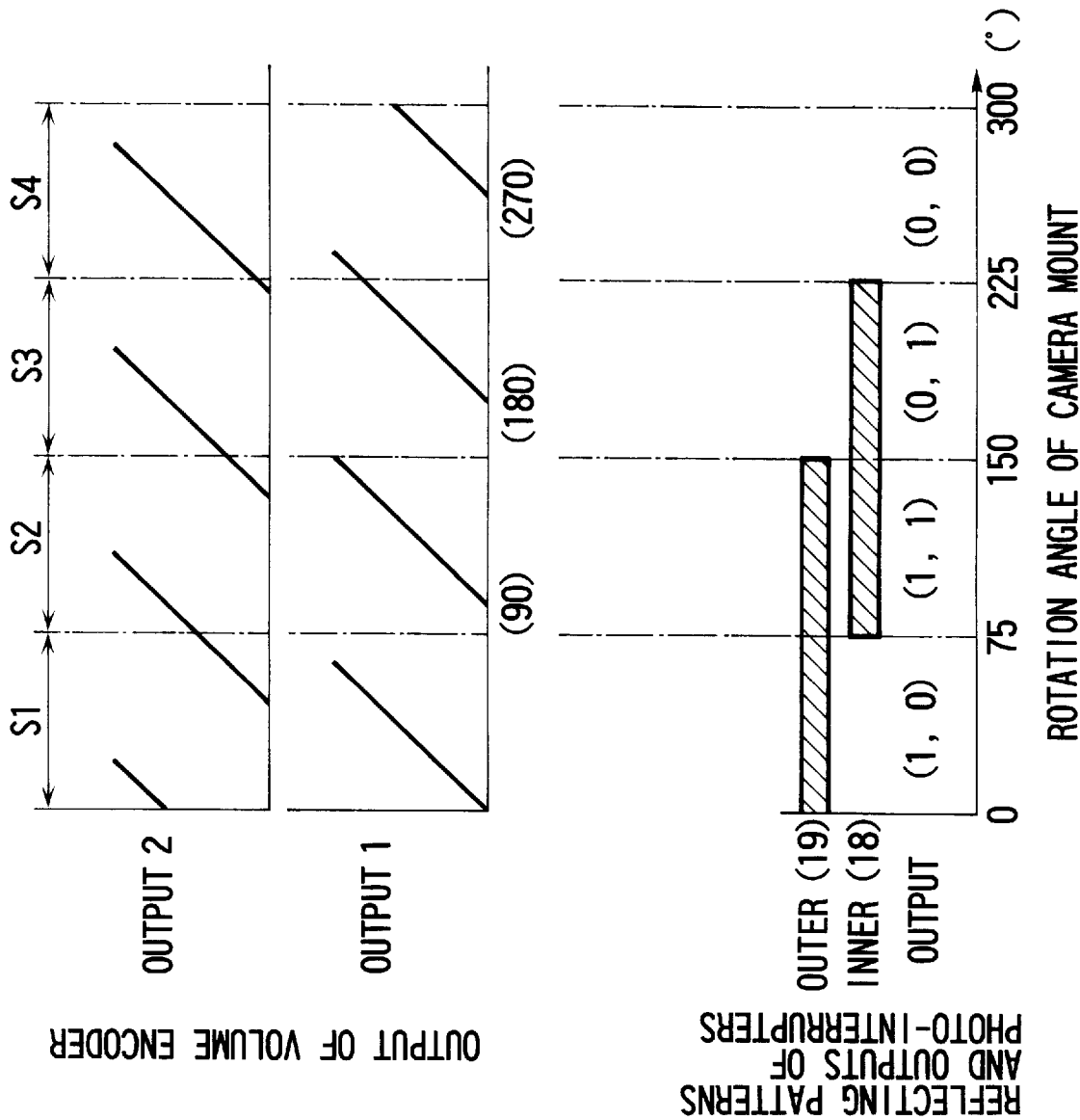

FIGS. 6(A) and 6(B) show the relation of the rotation angle of a camera mount to the outputs of the volume encoder and the relation of the rotation angle of the camera mount to reflecting patterns and outputs of photo-interrupters, respectively, in the panhead device in this invention.

Figure 7:
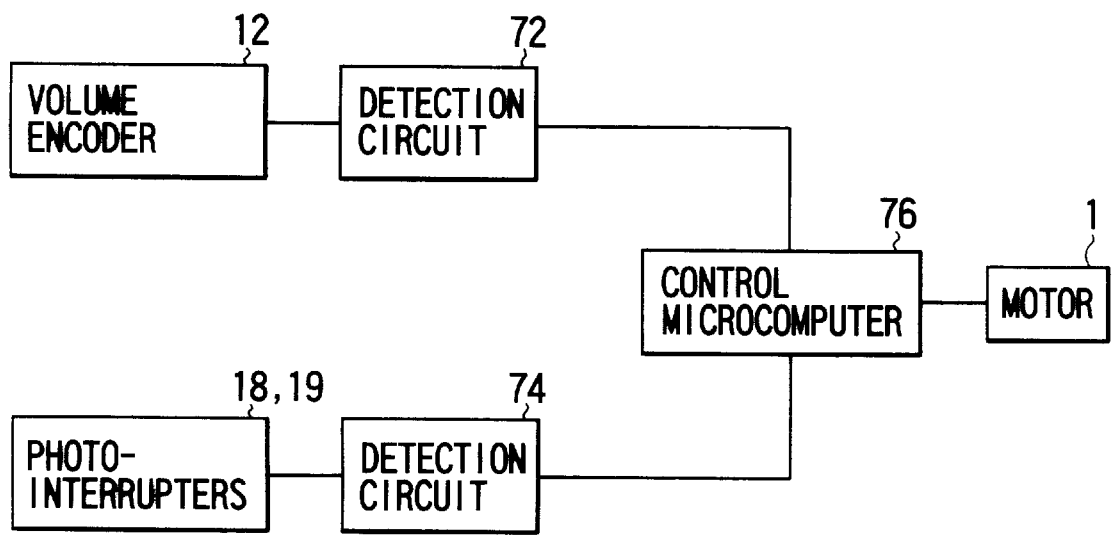

FIG. 7 is a block diagram showing by way of example the arrangement of a control system for a panning mechanism included in the panhead device according to the first embodiment of this invention.

Figure 8:
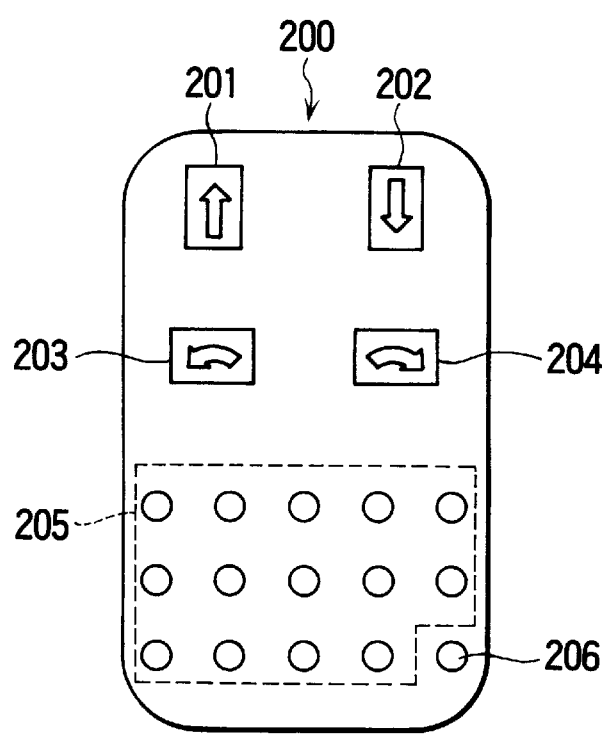

FIG. 8 shows by way of example an operation panel disposed on the side of the body of a control device for the panhead device in this invention.

Figure 9:
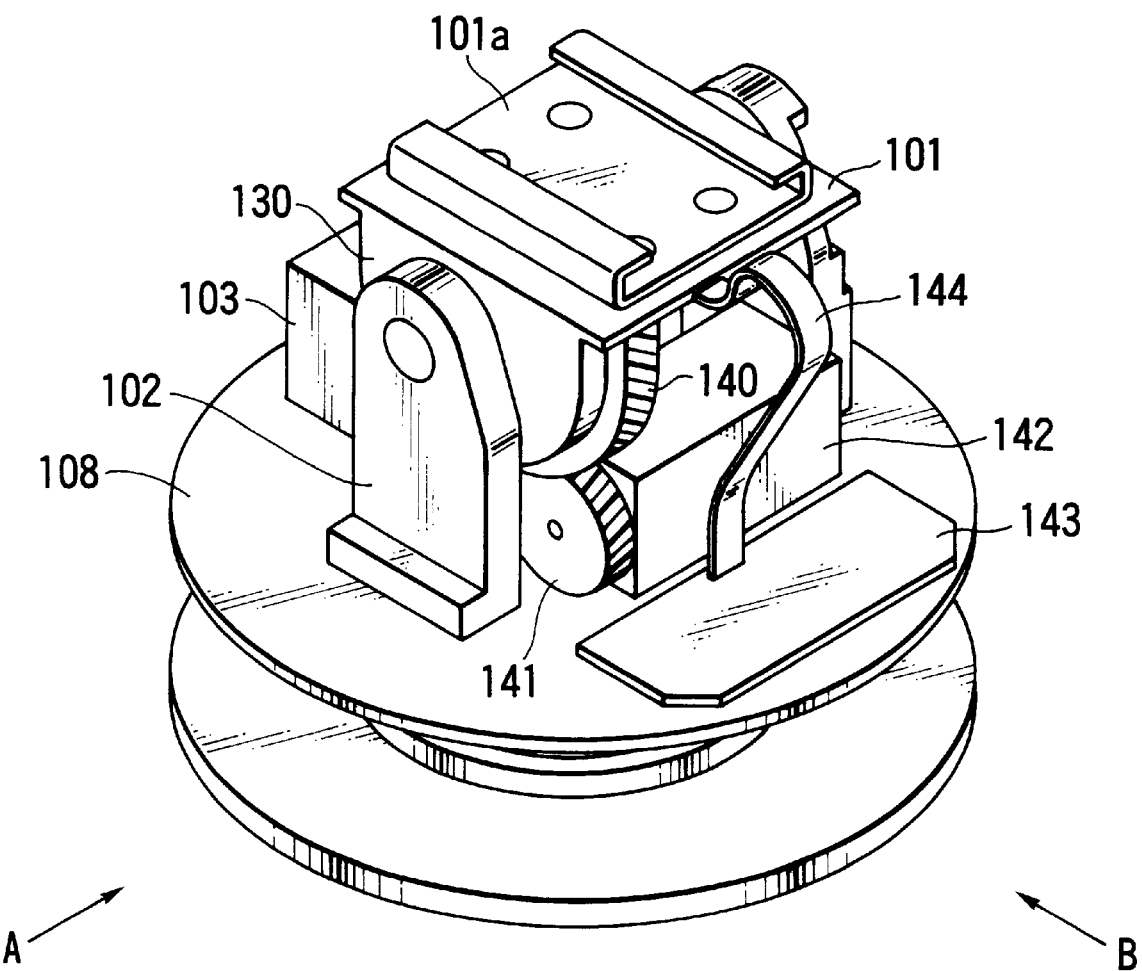

FIG. 9 is a perspective view showing the whole arrangement of a panhead device arranged according to this invention as a second embodiment thereof.

Figure 10:
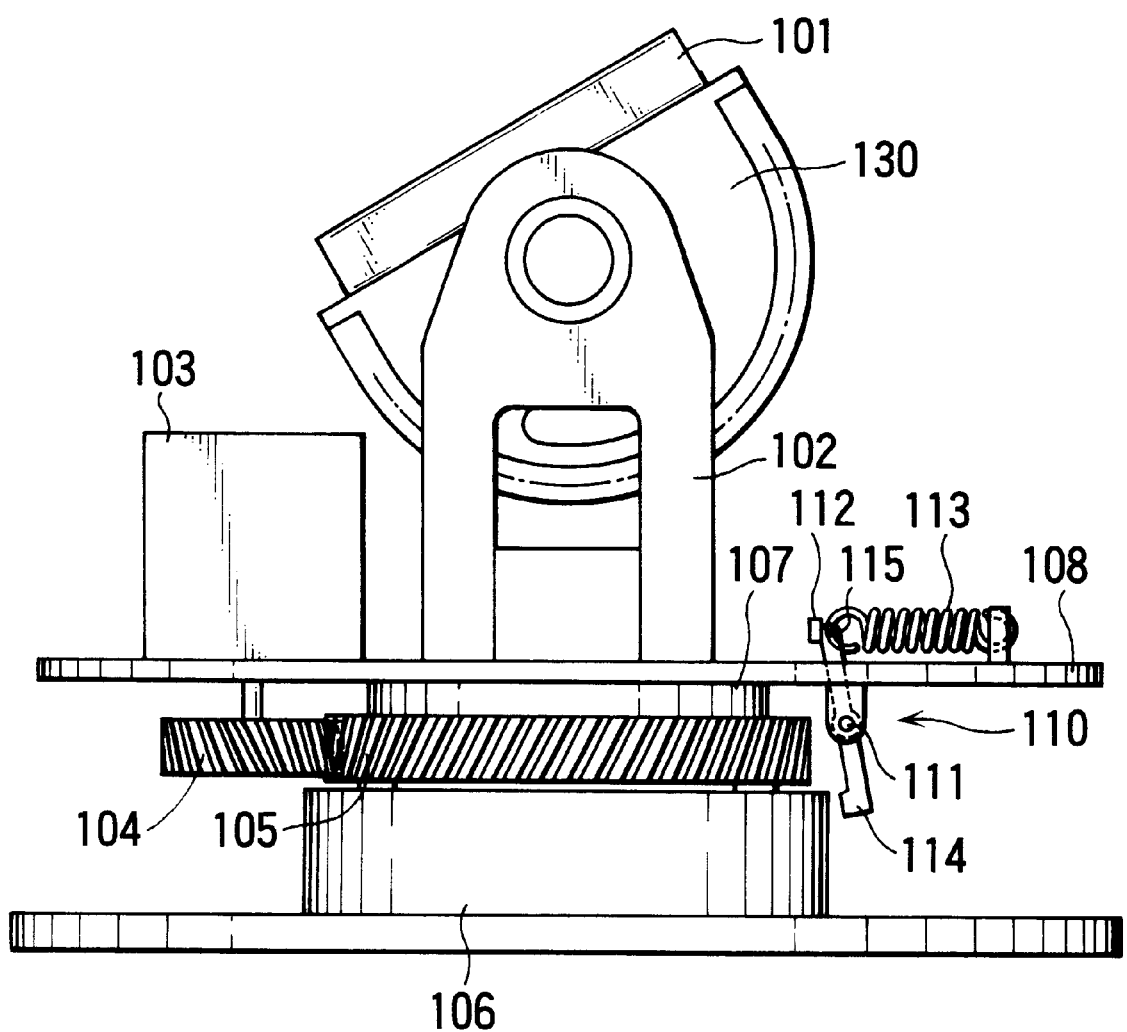

FIG. 10 is a side view taken in the direction of an arrow A in FIG. 9 showing the panhead device according to the second embodiment of this invention.

Figure 11:
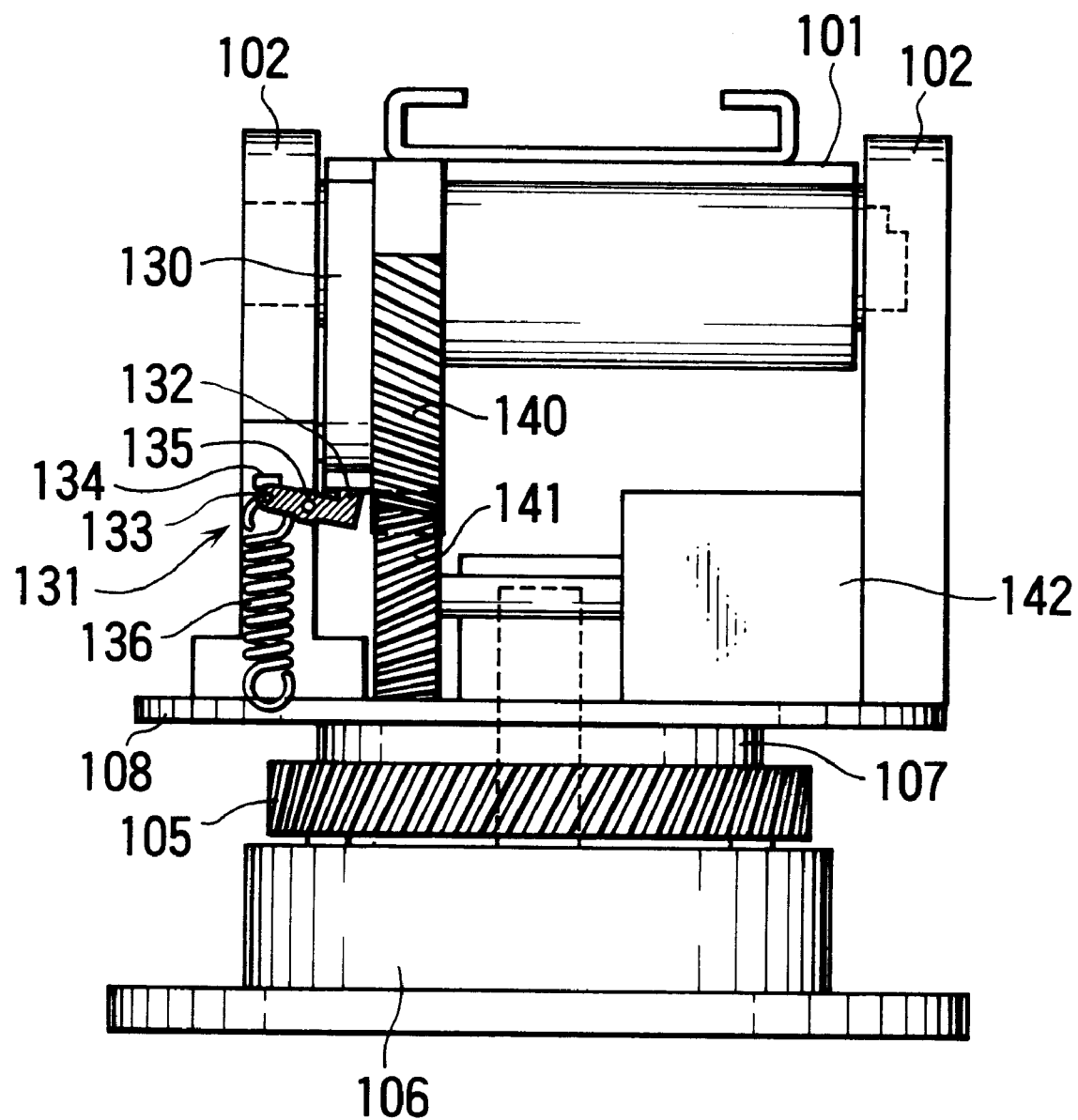

FIG. 11 is a side view taken in the direction of an arrow B in FIG. 9 showing the panhead device according to the second embodiment of this invention.

Figure 12A:
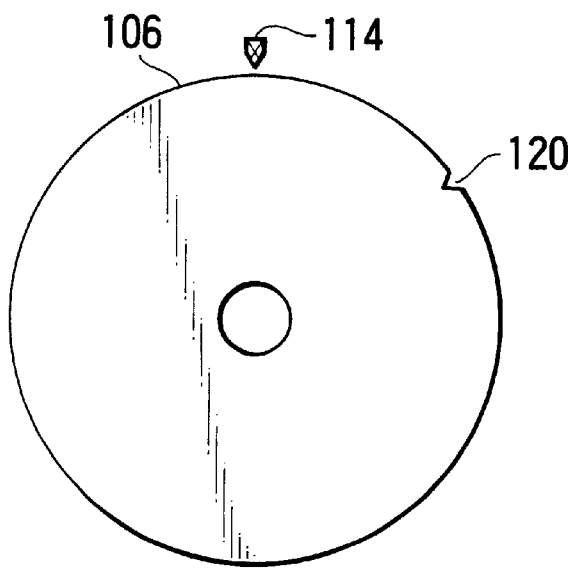
Figure 12B:
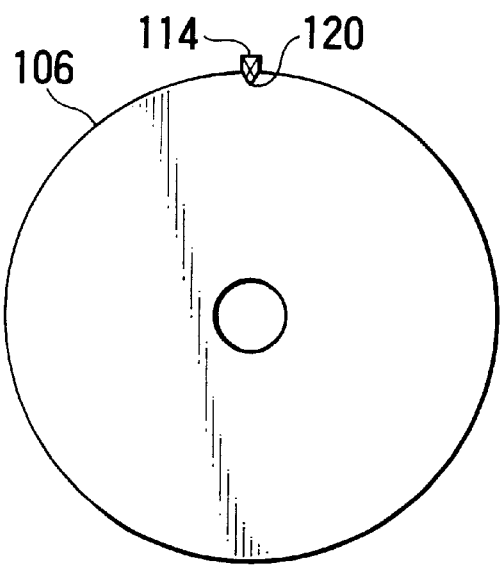

FIGS. 12(A) and 12(B) show the action of a panning click mechanism included in the panhead device according to the second embodiment of this invention.

Figure 13A:
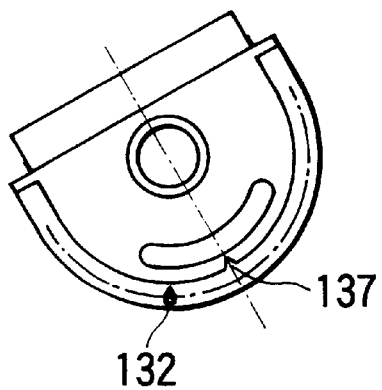
Figure 13B:
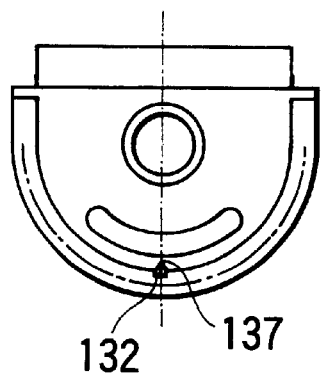

FIGS. 13(A) and 13(B) show the action of a tilting click mechanism included in the panhead device according to the second embodiment of this invention.

Figure 14:
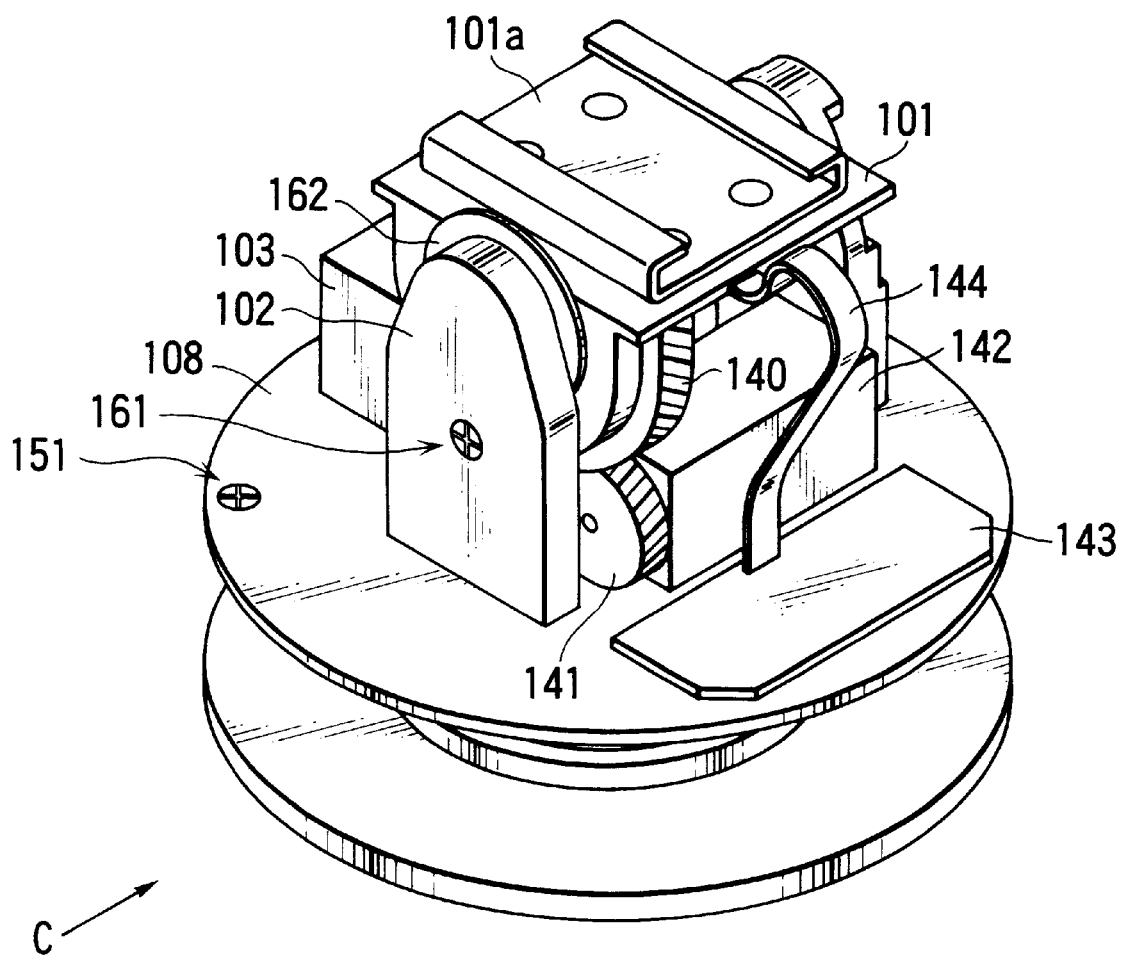

FIG. 14 is a perspective view showing the whole arrangement of a panhead device arranged according to this invention as a third embodiment thereof.

Figure 15:
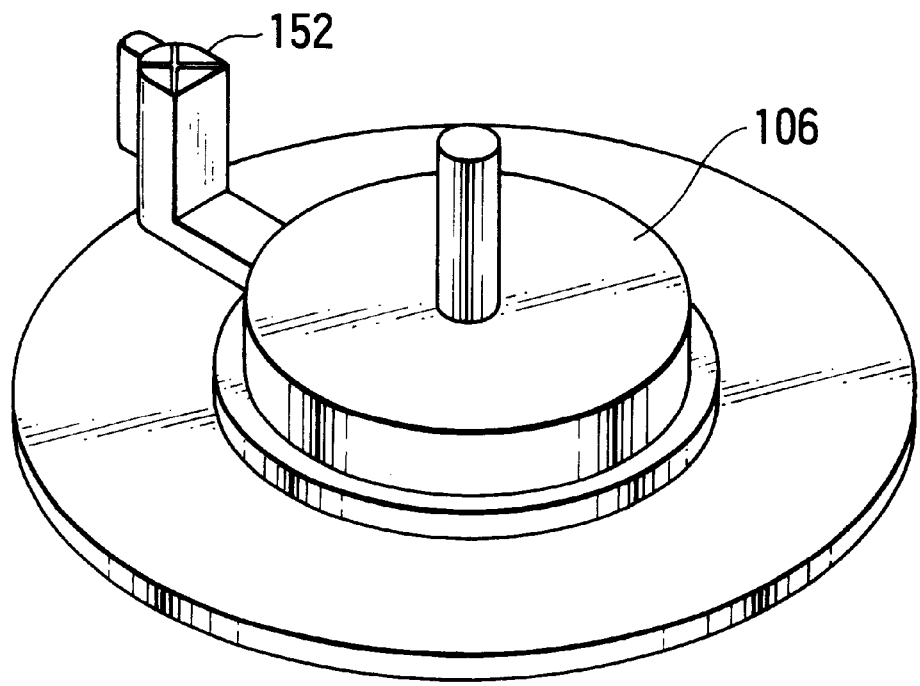

FIG. 15 is a perspective view showing the arrangement of parts on a chassis of the panhead device according to the third embodiment of this invention.

Figure 16:
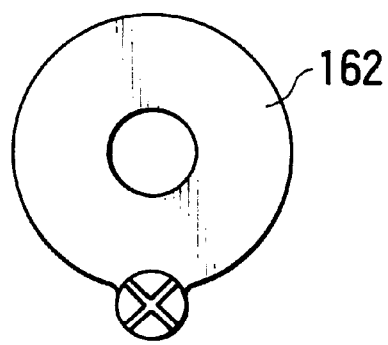

FIG. 16 shows a disk provided in the panhead device according to the third embodiment of this invention.

Figure 17:
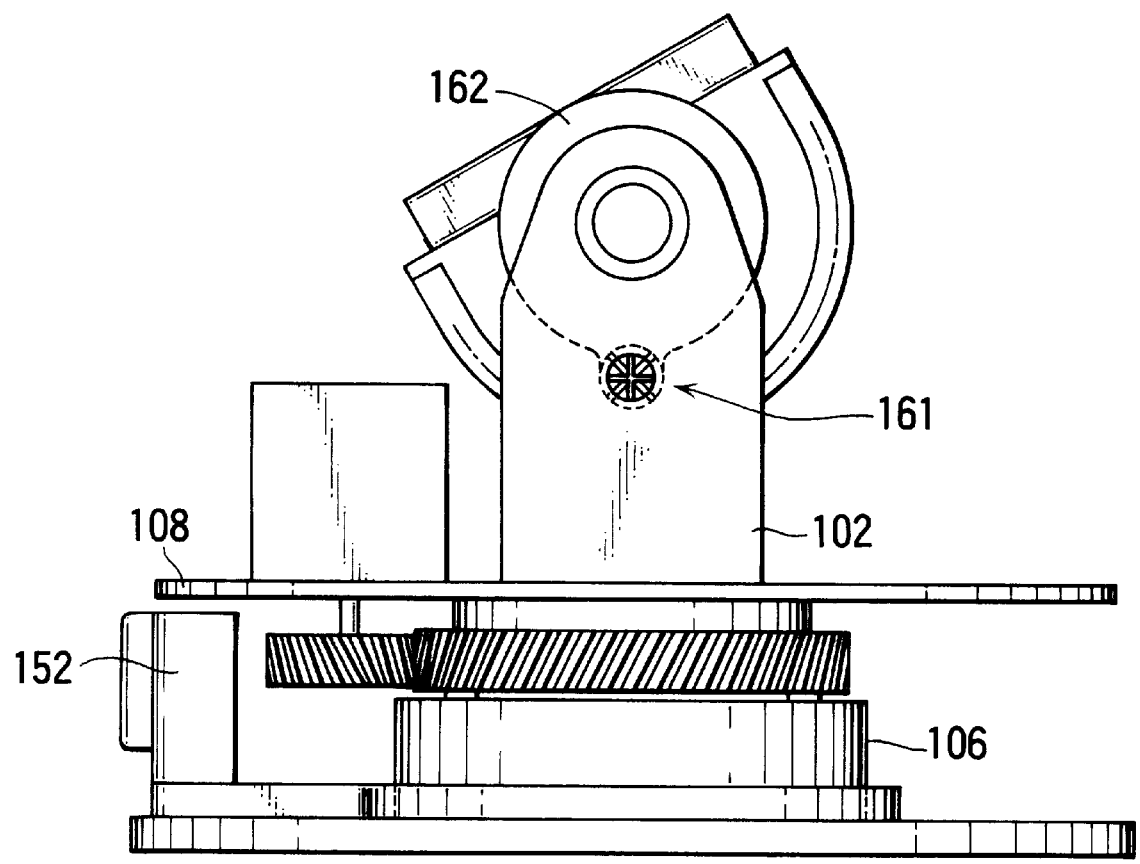

FIG. 17 is a side view taken in the direction of an arrow C in FIG. 14 showing the panhead device according to the third embodiment of this invention.

Figure 18:
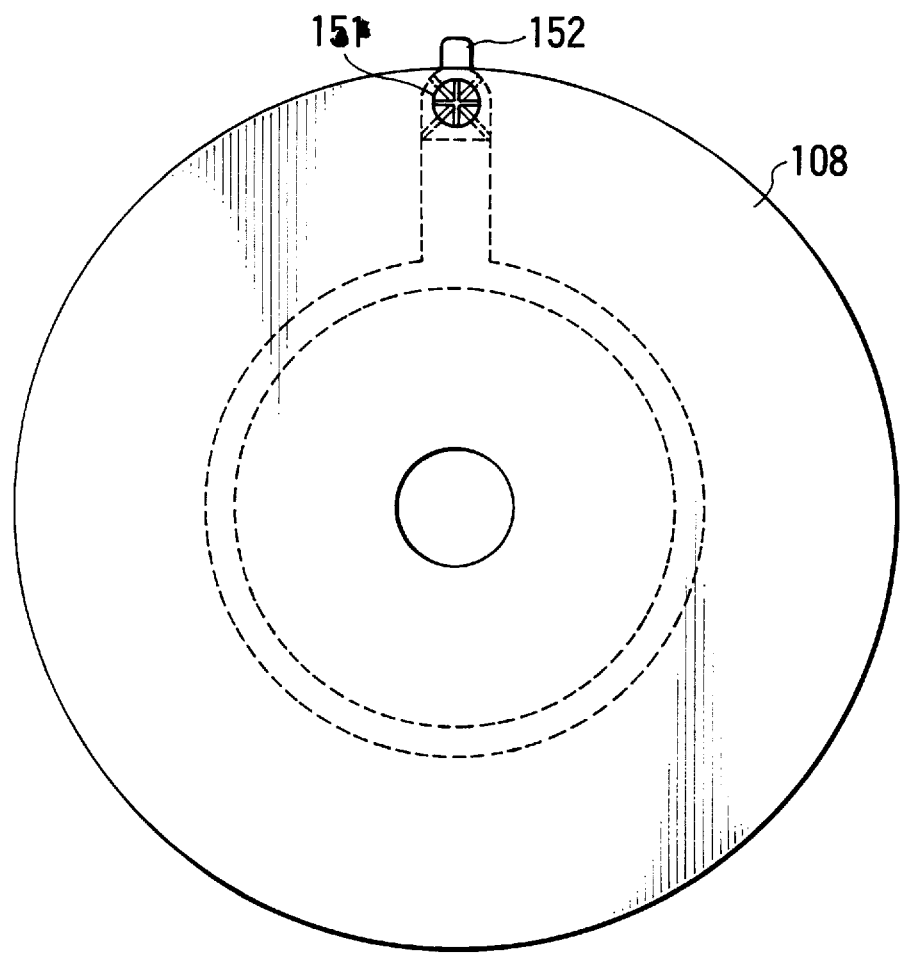

FIG. 18 is a top view showing the chassis of the panhead device according to the third embodiment of this invention.

Figure 19:
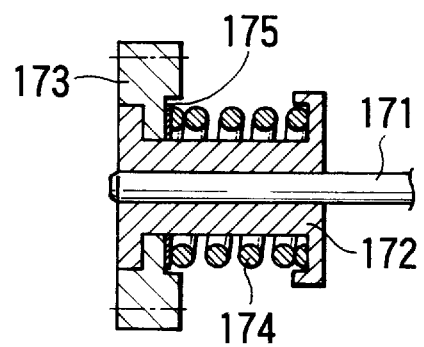

FIG. 19 is a sectional view showing a tilting drive gear and parts around the tilting drive gear arranged in accordance with this invention.

DETAILED DESCRIPTION OF THE INVENTION

Hereinafter, preferred embodiments of this invention will be described with reference to the drawings.

Figure 1:
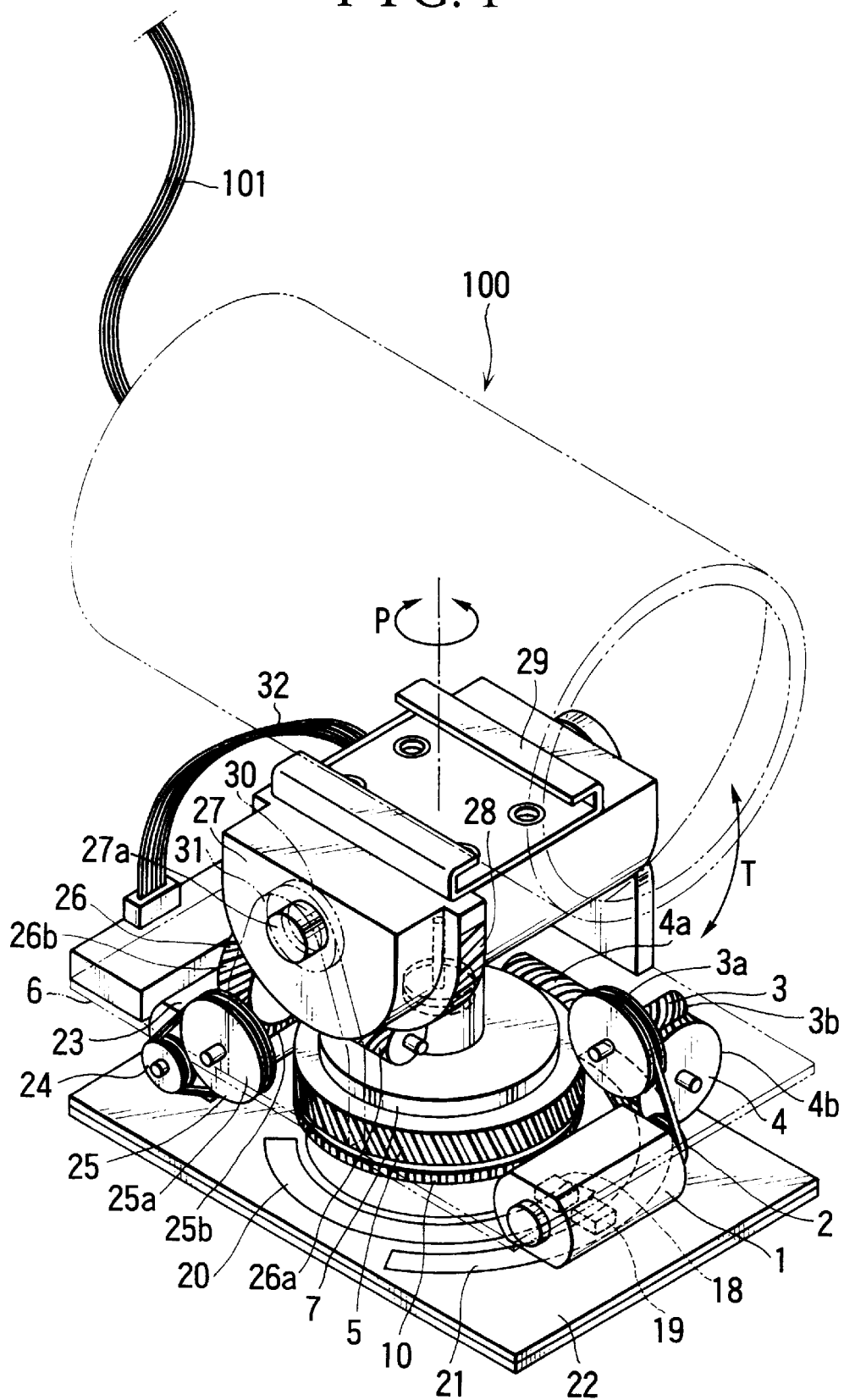
FIG. 1 is a perspective view showing the whole arrangement of a panhead device arranged according to this invention as a first embodiment thereof.
Figure 2:
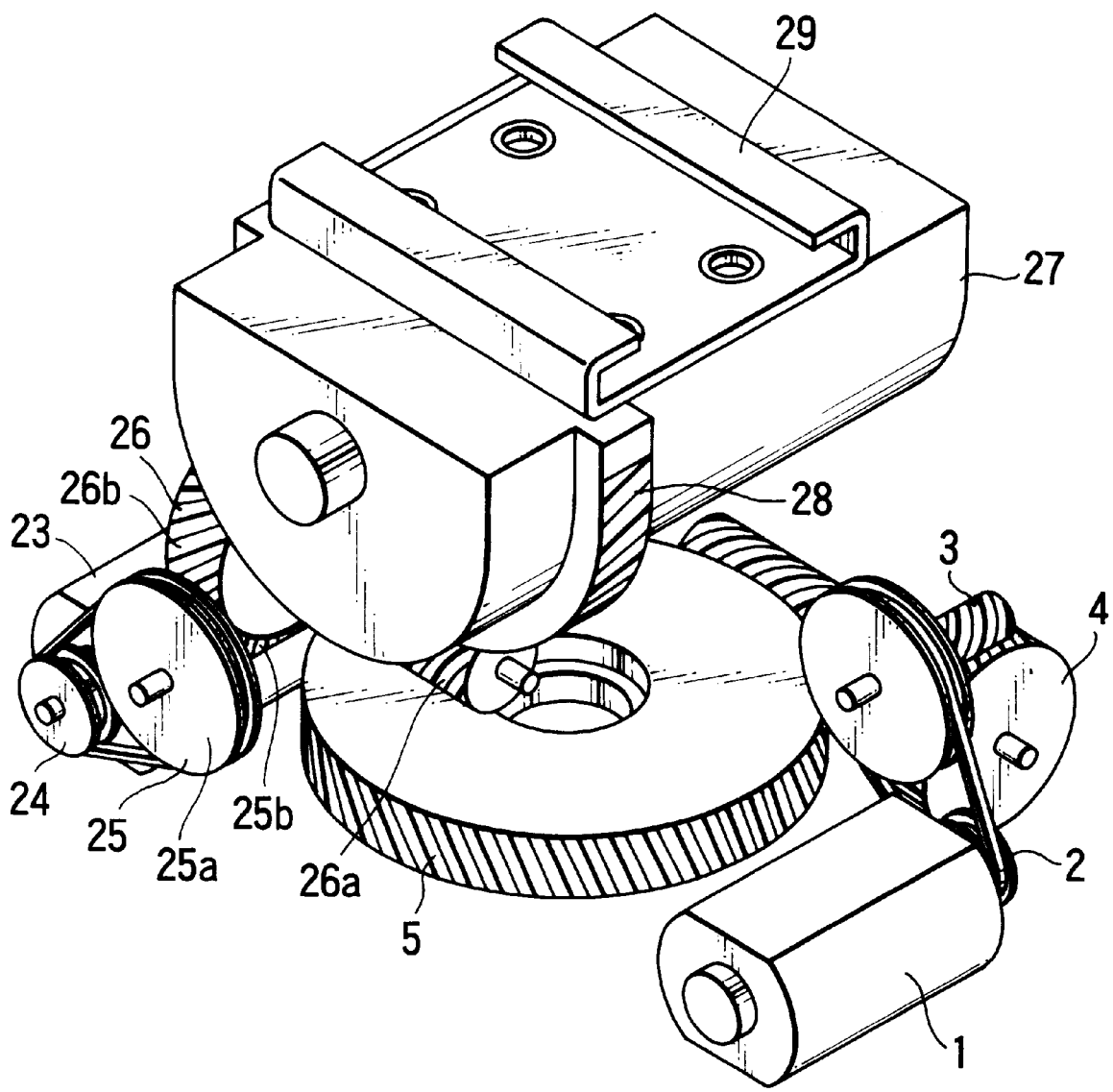
FIG. 2 is a perspective view showing a driving mechanism of the panhead device according to the first embodiment of this invention.
Figure 3:
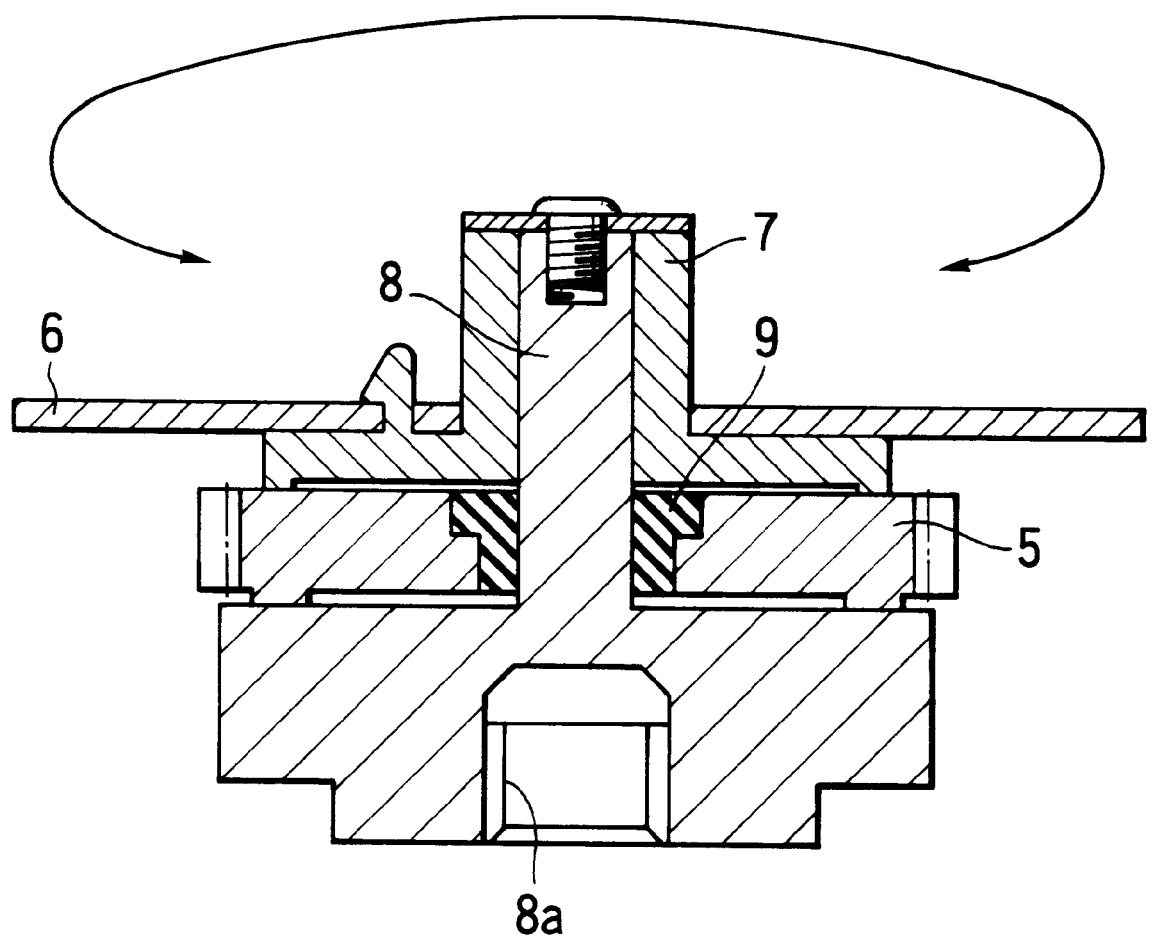
FIG. 3 is a sectional view showing a main shaft and parts around the main shaft of the panhead device according to the first embodiment of this invention.
Figure 4:
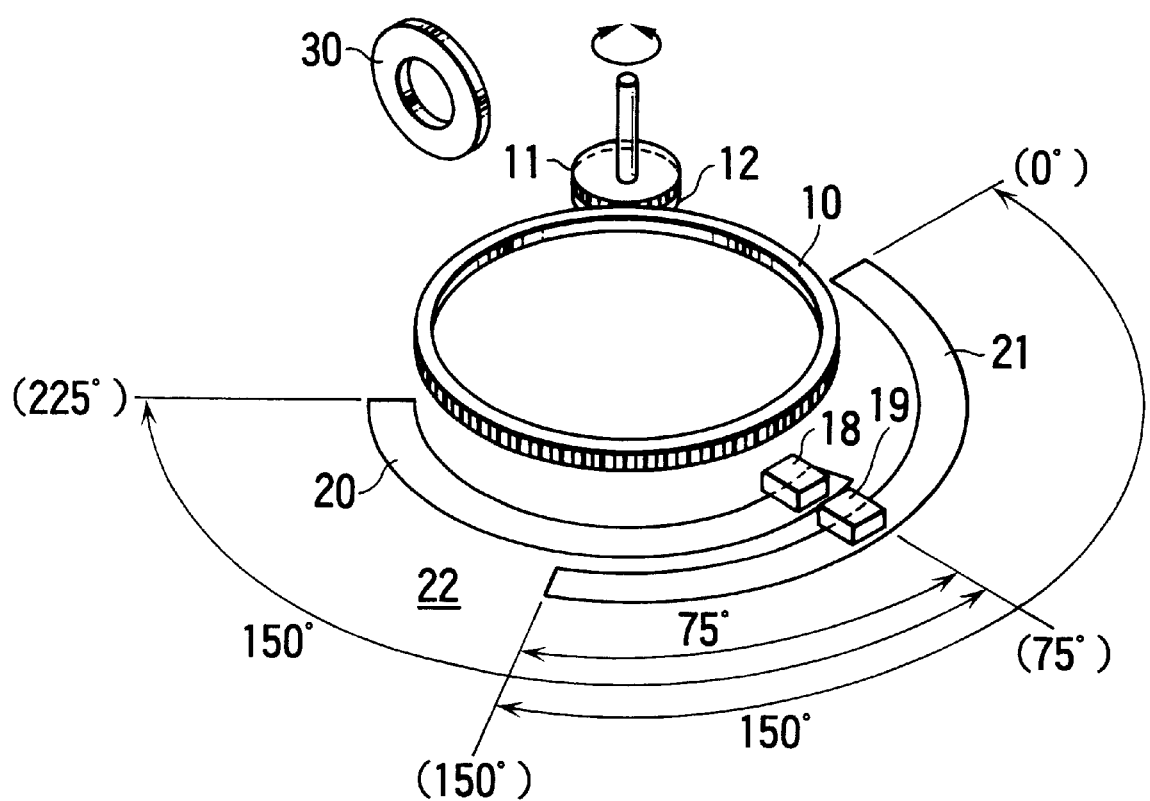
FIG. 4 is a perspective view showing a control mechanism included in the panhead device according to the first embodiment of this invention.

FIGS. 1 to 4 show the arrangement of a panhead device as a first embodiment of this invention. Of these figures, FIG. 1 shows in a perspective view the whole arrangement of the panhead device with its exterior member omitted from the illustration. FIG. 2 is a perspective view showing a driving mechanism. FIG. 3 is a sectional view showing a main shaft and parts around it. FIG. 4 is a perspective view showing a control mechanism.

Referring to FIG. 1, a camera head 100 is supposed to be supported by the panhead device. The panhead device is provided with a panning mechanism for panning the camera head 100 around a main shaft in the direction of arrows P, and a tilting mechanism for tilting the camera head 100 in the direction of arrows T.

The panning mechanism in the panhead device is first described below.

Referring to FIGS. 1 and 2, a motor 1 for panning has a small pulley 2 mounted on its output shaft. A gear 3 is composed of a large pulley 3a and a worm 3b formed as an integral unit. A toothed belt is placed between the small pulley 2 and the large pulley 3a, as shown in FIGS. 1 and 2. A gear 4 is composed of a worm 4a and a worm wheel 4b formed as an integral unit. There is provided another worm wheel 5. The worm 3b is in mesh with the worm wheel 4b, and the worm wheel 4a is in mesh with the worm wheel 5. These parts 1, 2, 3 and 4 are mounted on a single sub-chassis 6. Thus, the sub-chassis 6 on which the parts 1 to 4 are mounted are arranged to be rotated together by a panning operation.

Parts of the panhead device around its main shaft are described here with reference to FIG. 3.

Referring to FIG. 3, a bearing 7 is mounted on the sub-chassis 6. In FIG. 3, the main shaft is denoted by reference numeral 8. As shown in FIG. 3, the main shaft 8 has its lower part arranged to be thick (to have a larger diameter than its upper part) in such a way as to lower the center of gravity of the panhead device as a whole. A camera screw 8a which is provided for a tripod is formed in the bottom part of the main shaft 8. The bearing 7 and the main shaft 8 are designed to have minimal friction between them. The sub-chassis 6 is thus arranged to readily rotate around the main shaft 8 integrally with the bearing 7.

A bush 9 made of a rubber material is press-fitted into the worm wheel 5. The main shaft 8 is press-fitted into the bush 9. The worm wheel 5 is thus secured to the main shaft 8 through the bush 9 with a predetermined coupling strength. The worm wheel 5 is arranged to be able to be rotated on the main shaft 8 when torque having a magnitude greater than a predetermined value around the main shaft 8 is applied to the worm wheel 5. In other words, in this arrangement, clutch means (a friction clutch) is formed between the main shaft 8 and a member arranged to rotate around the main shaft 8. The clutch means permits a manual operation on the panhead device by imposing thereon a torque load having a magnitude greater than a predetermined torque other than the driving force of the motor 1.

The panning mechanism is configured as described above. When a predetermined driving voltage is applied to the motor 1, power of the motor 1 is transmitted through the toothed belt to the gear 3. The power is transmitted in turn from the gear 3 to the gear 4 and then from the gear 4 to the worm wheel 5. Since the worm wheel 5 is coupled to the main shaft 8 in the above-stated manner, the worm wheel 5 does not move and remains stationary. The gear 4 and the parts coupled with the gear 4 on the side of the motor 1, therefore, rotate with respect to the worm wheel 5, that is, around the main shaft 8. In the case of the first embodiment, the angle range of such a panning operation is set to 300 degrees. This angle range is controlled by a control mechanism, which will be described below.

Referring to FIGS. 1 and 4, there is provided a large spur gear 10, which is fixed to the main shaft 8. A small spur gear 11 is in mesh with the large spur gear 10. The rotation fulcrum shaft of the small spur gear 11 is connected to the sub-chassis 6. When the sub-chassis 6 rotates around the main shaft 8, the small spur gear 11 rotates while intermeshing with the large spur gear 10. In this case, the ratio in pitch circle diameter of the small spur gear 11 to the large spur gear 10 is 1:4. When the sub-chassis 6 rotates 300 degrees around the main shaft 8, therefore, the small spur gear 11 makes 3.3 turns for one turn of the sub-chassis 6. There is also provided a volume encoder 12, which has brushes fixed to the small spur gear 11.

FIGS. 5(A) and 5(B) show an example of the structure of the volume encoder 12. As shown in FIG. 5(A), the volume encoder 12 is provided with two brushes 13 and 14 each of which is composed of a good electric conductor having a pair of contact parts, and three wiring patterns 15, 16 and 17 which are formed in a triple arcuate shape. These parts are overlaid on each other as indicated by an arrow to be in a state of being matched with each other as shown in FIG. 5(B). In the case of this example, the brushes 13 and 14 are disposed on a rotating side, i.e., on the side of the small spur gear 11, and the wiring patterns 15, 16 and 17 are disposed on a stationary side, i.e., on the side of the sub-chassis 6.

Of the wiring patterns 15, 16 and 17, the wiring pattern 15, which is located outermost, is made of a resistor, while the other two wiring patterns 16 and 17, which are located on the inner side, are made of copper foil. The two brushes 13 and 14 are arranged to be caused by the rotation of the small spur gear 11 to rotate while sliding on the arcuate wiring patterns 15, 16 and 17 in contact therewith. The brush 13 is arranged to output a voltage (output 1) obtained between one end of the resistor pattern 15 and the copper foil pattern 16, and the other brush 14 is arranged to output a voltage (output 2) obtained between one end of the resistor pattern 15 and the copper foil pattern 17.

FIG. 6(A) shows a relation between the rotation angle (in the panning direction) of a camera mount 27 (which will be described later) and the outputs of the volume encoder 12. In the case of the first embodiment, the panning angle range is set to 300 degrees as mentioned above. While the camera mount 27 rotates 300 degrees, the outputs of the volume encoder 12, i.e., outputs 1 and 2, vary as shown in a graph of FIG. 6(A). In the graph of FIG. 6(A), the abscissa axis shows the rotation angle of the sub-chassis 6 relative to the main shaft 8 and the ordinate axis shows the voltage outputs of the volume encoder 12.

Referring again to FIGS. 1 and 4, each of photo-interrupters 18 and 19 is composed of a pair of elements, i.e., light emitting and receiving elements, formed as an integral unit. The photo-interrupters 18 and 19 are mounted on the lower side of the panning motor 1 (FIG. 1). In each of the photo-interrupters 18 and 19, light emitted from the light emitting element is received by the light receiving element after the light is reflected by a reflecting pattern, and a signal of "1" or "0" is outputted according to whether the light falls on the light receiving element or not. A main chassis 22 is fixed to the main shaft 8 and is arranged to support the whole panhead device.

Reflecting patterns 20 and 21 are stuck to the surface of the main chassis 22 in predetermined positions corresponding to the photo-interrupters 18 and 19. The photo-interrupters 18 and 19 are arranged to have the light from the light emitting elements reflected by the corresponding reflecting patterns 20 and 21 and to output their outputs by receiving the reflected light at the light receiving elements. These reflecting patterns 20 and 21 are in shapes which coincide respectively with the loci of the photo-interrupters 18 and 19. In other words, they are in arcuate shapes having their centers at the main shaft 8. In this case, the central angle of each arc is arranged to be 150 degrees. The phases of the two reflecting patterns 20 and 21 are arranged to deviate 75 degrees from each other.

The positional relation of the reflecting patterns 20 and 21 to the photo-interrupters 18 and 19 is schematically shown in FIG. 6(B). Referring to FIG. 6(B), the relation is expressed on the basis of the rotation angles (0 to 300 degrees) of the camera mount 27 with respect to the main shaft 8. Within a range of rotation angles 0 to 75 degrees of the camera mount 27, i.e., an area S1, the outer photo-interrupter 19 is opposed to the reflecting pattern 21, while the inner photo-interrupter 18 is located off the reflecting pattern 20. Therefore, a combined output value of the two photo-interrupters 19 and 18 becomes (1, 0).

Within a rotation angle range from 75 to 150 degrees, i.e., an area S2, the combined output value becomes (1, 1). Within a rotation angle range from 150 to 225 degrees, i.e., an area S3, the combined output value becomes (0, 1). Within a rotation angle range from 225 to 300 degrees, i.e., an area S4, the combined output value becomes (0, 0).

FIG. 7 shows by way of example the arrangement of a control system for the panning mechanism. As shown in FIG. 7, the voltage output of the volume encoder 12 is detected by a detection circuit 72. The value of the voltage detected by the detection circuit 72 is sent to a control microcomputer 76. The outputs of the photo-interrupters 18 and 19 are likewise detected by a detection circuit 74. A value thus obtained by the detection circuit 74 is sent also to the control microcomputer 76. The control microcomputer 76 determines the position of the camera mount 27 on the basis of a combination of the combined output value of the photo-interrupters 18 and 19 and the voltage output of the volume encoder 12 obtained as shown in FIGS. 6(A) and 6(B), and drives and controls the panning motor 1 according to the position of the camera mount 27 thus determined.

The combined output value of the photo-interrupters 18 and 19 varies in a cycle of 75 degrees because of their positional arrangement which is shown in FIG. 4. On the other hand, the output of the volume encoder 12, i.e., a combined value of the outputs 1 and 2 shown in FIG. 6(A), varies in a cycle of 360 degrees. Considering the output in relation to the rotation angle of the camera mount 27 with the rotation angle of the camera mount 27 used as a datum, the output of the volume encoder 12 varies in cycle of 90 degree because, in this case, the rotation ratio between the two is 1:4. In this case, therefore, these outputs never appear in the same value within a rotation angle range less than 300 degrees of the sub-chassis 6. In other words, it is possible to detect, from the outputs of the photo-interrupters 18 and 19, in which of the areas S1 to S4 the rotating position of the sub-chassis 6 relative to the main shaft 8 is located. Further, the rotating position of the sub-chassis 6 within the detected area can be detected from the output of the volume encoder 12. The outputs of the photo-interrupters 18 and 19 and the output of the volume encoder 12 are controlled by the control microcomputer 76 shown in FIG. 7.

Next, the tilting mechanism in the panhead device is described below.

Referring to FIGS. 1 and 2, there are provided a motor 23 for tilting, a small pulley 24 which is mounted on the output shaft of the motor 23, a gear 25 composed of a large pulley 25a and a worm 25b formed as an integral unit, a gear 26 composed of a worm 26a and a worm wheel 26b formed as an integral unit, and a worm wheel 28 formed on the camera mount 27. The worm 25b is in mesh with the worm wheel 26b. The worm 26a is in mesh with the worm wheel 28.

The camera mount 27 is provided with an accessory shoe 29. Reference numeral 30 denotes a volume encoder which will be described later herein. A support post 31 is arranged to support the camera mount 27 and is provided with a bearing for the camera mount 27. These parts are mounted on the sub-chassis 6.

In the case of the tilting mechanism, the worm 26a of the gear 26 is arranged to have a large angle of lead, which is set, for example, at 25 degrees. With the tilting mechanism arranged in this manner, when a load having a magnitude greater than a predetermined value is applied to the camera mount 27 in the direction of tilting, the worm 26a of the gear 26 is caused to rotate, so that the rotation torque of the worm 26a is transmitted to the tilting motor 23. However, when a load having a magnitude greater than a predetermined value is applied to the tilting motor 23, a current flowing to the tilting motor 23 is caused to be cut off by a control circuit, which will be described later.

A control mechanism for the tilting mechanism includes the above-stated volume encoder 30. The volume encoder 30 is arranged substantially in the same manner as the volume encoder 12 which is provided for control over the panning mechanism.

On the sub-chassis 6, there are provided a driving circuit and a control circuit for the motors 1 and 23. The microcomputer 76 (FIG. 7) and a memory are included in the control circuit. The panhead device is controlled by the microcomputer 76 when an instruction is given from on the side of a control device body (not shown) by operating an operation switch (FIG. 8) on a video camera which has a liquid crystal monitor.

In actually using the panhead device configured as described above, the camera head 100, which is small-sized, is secured to the camera mount 27 in a predetermined position through the accessory shoe 29 which conforms to applicable standard specifications. The camera head 100 is connected to the control device body through a cable 101 to receive power and control signals from the control device body. Further, the camera head 100 sends power and control signals to the panning motor 1 and the tilting motor 23 through a cable 32.

An example of operation of the panhead device is next described in detail.

An operation panel 200 on which operation switches of varied kinds are arranged as shown in FIG. 8 is disposed on the side of the control device body for the panhead device. The operation panel 200 has tilting switches 201 and 202 and panning switches 203 and 204. The sub-chassis 6 and members coupled thereto of the panhead device rotate counterclockwise while the switch 203 is continuously being pushed and rotate clockwise while the switch 204 is continuously being pushed. The camera mount 27 tilts upward while the switch 201 is continuously being pushed and downward while the switch 202 is continuously being pushed.

In the operation panel 200, there are further provided a presetting switch group 205 and a presetting mode switch 206. The presetting switch group 205 is provided for causing an angle of the camera mount 27 relative to the main shaft 8 to be stored in response to a predetermined operation performed on the operation panel 200.

The camera mount 27 can be rotated to a desired position by the operator by operating the panning switches 203 and 204 or the titling switches 201 and 202. When one switch of the presetting switch group 205 is pushed by the operator within, for example, two seconds after the presetting mode switch 206 is pushed with the camera mount 27 in the desired position, an angle of the camera mount 27 relative to the main shaft 8 at that moment is stored in a memory. The angle of the camera mount 27 relative to the main shaft 8 thus once stored in the memory is retained until the similar operation is performed again. Therefore, the operator can direct the camera head 100 in a direction stored beforehand in the memory by pushing the presetting switch group 205, no matter which direction the camera mount 27 has been set.

This invention is not limited to the numerical values mentioned by way of example in the description of the first embodiment. These values may be changed to some other suitable values.

Further, the clutch mechanism used in the panning mechanism is applicable also to the tilting mechanism. In that case, the clutch mechanism may be disposed between a support shaft 27a of the camera mount 27 and the support post 31.

Further, the position detecting means used in the panning mechanism may be disposed also between the camera mount 27 and the support post 31.

In the meantime, in driving the panning mechanism or the tilting mechanism of a panhead device of the kind described above, it is very important for securing the smoothness and accuracy of control over the driving system to grasp information on normal positions (or home positions) and specific positions in the panning and tilting directions of the camera mount. Accordingly, a panhead device according to a second embodiment of this invention is arranged to excel in handling information on these positions. The second embodiment is arranged as described below.

FIG. 9 to FIGS. 13(A) and 13(B) show in outline the arrangement of the panhead device according to the second embodiment of this invention. Of these figures, FIG. 9 schematically shows in a perspective view the whole arrangement of the panhead device (with the exception of its exterior member). FIG. 10 is a side view taken in the direction of an arrow A in FIG. 9. FIG. 11 is a side view taken in the direction of an arrow B in FIG. 9. FIGS. 12(A) and 12(B) show the action of a click member in the panning direction. FIGS. 13(A) and 13(B) show the action of a click member in the tilting direction.

Referring to FIG. 9 to FIGS. 13(A) and 13(B), essential parts of the panhead device according to the second embodiment are first described as follows. In the panhead device, a camera mount 101 has an accessory shoe 101a disposed on its upper surface. A camera head or the like having a mount member corresponding to the accessory shoe 101a can be mounted on the camera mount 101. The mount member of the camera head is arranged to be detachably fitted into and coupled with the accessory shoe 101a of the camera mount 101. The mount member has a plurality of electric contacts arranged on its bottom side with a lead wire connected to each of the contacts.

The accessory shoe 101a of the camera mount 101, on the other hand, is provided also with electric contacts which correspond to those of the mount member of the camera head. When the mount member of the camera head is fitted into the accessory shoe 101a, these electric contacts come into contact with each other to permit communication between the camera head and the panhead device. In the case of the second embodiment, the panhead device is thus arranged to receive power and control signals from the camera head through these electric contacts.

A helical gear 140 is formed integrally with the camera mount 101. A camera-mount side plate 130 is secured to one side of the camera mount 101. The camera-mount side plate 130 is provided with a recessed part 137, which is formed as shown in FIGS. 13(A) and 13(B). A camera-mount support post 102 is arranged to support the camera mount 101. A tilting drive unit 142 is arranged to output its driving power through a tilting drive gear 141.

The tilting drive gear 141 and parts around it are arranged as follows. Referring to FIG. 19, the tilting drive unit 142 has an output shaft 171, a spring retainer 172, a helical gear 173, a compression spring 174, and a spring seat 175. The spring retainer 172 is press-fitted into the output shaft 171. The helical gear 173 is pressed against the spring retainer 172 by the force of the compression spring 174. The helical gear 173 is arranged such that, exertion of a force larger than a predetermined force on the helical gear 173 against the rotation force of the output shaft 171 brings about slipping between the spring retainer 172 and the spring seat 175 of the compression spring 174, thereby enabling the helical gear 173 to rotate on the spring retainer 172.

An electric circuit board 143 is arranged to drive the motor of the tilting drive unit 142 and that of a panning drive unit which will be described later herein. The electric circuit board 143 receives power and control signals from the electric contacts provided at the accessory shoe 101a. When the power is supplied to the tilting drive unit 142 from a power supply which is not shown, the tilting drive gear 141 causes the helical gear 140 to rotate, thereby changing the inclination of the camera mount 101. The camera mount 101 can be also manually tilted when a force having a magnitude greater than a predetermined value is applied to the camera mount 101 by the operator.

A base 106 is provided with a notch 120 in the periphery thereof as shown in FIGS. 12(A) and 12(B). With the exception of a portion where the notch 120 is formed, the whole periphery of the base 106 is smoothly formed. A panning bearing 107 is arranged to be rotatable on a rotation shaft which is perpendicularly erected on the central part of the base 106. A chassis 108 is fixed to the surface of the panning bearing 107. The camera-mount support post 102, the tilting drive unit 142 and the panning drive unit which will be described later are fixed to the upper surface of the chassis 108.

A panning gear 105 is fixed to the base 106. The panning drive unit is denoted by reference numeral 103, which is composed of a motor and a plurality of gears. The output of the panning drive unit 103 is connected to a panning drive gear 104. The panning drive gear 104 is configured in the same manner as the tilting drive gear 141. The arrangement of the panning drive gear 104 is such that, when power is supplied to the panning drive unit 103 from the power supply which is not shown but is provided on the chassis 108, the chassis 108 and the members disposed on the chassis 108 rotate. The chassis 108 and the members disposed on the chassis 108 can be manually caused to rotate by the operator.

A tilting click member 131 has one fore end 132 formed in a wedge-like shape having a round tip. The other end part 133 of the tilting click member 131 is formed by an iron material. The tilting click member 131 is arranged to be rotatable around a rotation shaft 135. An electromagnet 134 is series-connected to the motor disposed inside the tilting drive unit 142. A tension spring 136 is stretched between the other end 133 of the tilting click member 131 and a stop member erected on the chassis 108. The pulling force of the tension spring 136 exerted on the tilting click member 131 is set to be weaker than an attracting force of the electromagnet 134 to be exerted on the other end 133 of the tilting click member 131.

A panning click member 110 has one fore end 114 formed in a wedge-like shape having a round tip. The other end part 115 of the panning click member 110 is formed by an iron material. The panning click member 110 is arranged to be rotatable around a rotation shaft 111. An electromagnet 112 is series-connected to the motor disposed inside the panning drive unit 103. A tension spring 113 is stretched between the other end 115 of the panning click member 110 and a stop member erected on the chassis 108. The pulling force of the tension spring 113 exerted on the panning click member 110 is set to be weaker than an attracting force of the electromagnet 112 to be exerted on the other end 115 of the panning click member 110.

An example of driving for a panning action of the second embodiment is next described. When a panning drive switch which is not shown is operated, a current flows to the electromagnet 112 and the motor. Therefore, the other end 115 of the panning click member 110 is attracted by the electromagnet 112. The fore end part 114 of wedge-like shape of the panning click member 110 comes to part from the base 106. Under this condition, the members disposed on the chassis 108 are caused to rotate by the panning drive gear 104.

When the flow of current to the panning drive unit 103 and the electromagnet 112 is cut off by operating the panning drive switch (not shown), the other end 115 of the panning click member 110 is pulled by the tension spring 113 to cause the fore end part 114 of wedge-like shape to come into contact with the base 106. Under that condition, a manual panning operation can be performed with a rotating force applied to the chassis 108 by the operator.

When the panning click member 110 falls into the notch 120 of the base 106, the operator can recognize that the camera mount 101 has arrived at its home position. Further application of the rotating force to the chassis 108 causes the panning click member 106 to override the notch 120 of the base 106 without difficulty.

An example of driving for a tilting action of the second embodiment is as follows. When a tilting drive switch which is not shown is operated, a current flows to the electromagnet 134 and the motor. Therefore, the other end 133 of the tilting click member 131 is attracted by the electromagnet 134. The fore end part 132 of wedge-like shape of the tilting click member 131 comes to part from the camera-mount side plate 130. Under this condition, the camera mount 101 is tilted by the tilting drive gear 141.

When the flow of current to the tilting drive unit 142 and the electromagnet 134 is cut off by operating the tilting drive switch (not shown), the other end 133 of the tilting click member 131 is pulled by the tension spring 136 to cause the wedge-like fore end part 132 of the tilting click member 131 to come into contact with the camera-mount side plate 130. Under that condition, a manual tilting operation can be performed with a rotating force applied to the camera mount 101 by the operator.

When the tilting click member 131 falls into the recessed part 137 of the camera-mount side plate 130, the operator can recognize that the camera mount 101 has arrived at its home position. Further application of the rotating force to the camera mount 101 causes the tilting click member 131 to override the recessed part 137 of the camera-mount side plate 130 without difficulty.

As described above, the panhead device according to the second embodiment of this invention is arranged to give an apposite click feeling at the home position of the camera mount 101 only when the panhead device is manually operated. The click feeling enables the operator to know arrival of the camera mount 101 at the home position. It is another advantage of the second embodiment that the click member never causes any increase in resistance to rotation when the panhead device is operated by the motor.

A panhead device according to a third embodiment of this invention is next described. FIGS. 14 to 18 show in outline the arrangement of the panhead device according to the third embodiment. Of these figures, FIG. 14 shows in a perspective view the whole arrangement of the panhead device, with the exception of its exterior member. FIG. 15 shows in a perspective view the panhead device with a chassis and members on the chassis omitted from the illustration. FIG. 16 shows a disk, which will be described later. FIG. 17 shows the panhead device in a side view taken in the direction of an arrow C indicated in FIG. 14. FIG. 18 shows the chassis and a stand as viewed from above.

The essential component parts of the panhead device according to the third embodiment are first described with reference to FIGS. 14 to 18. In these figures, all parts that perform the same actions as those of the parts of the second embodiment are indicated by the same reference numerals and the details of them are omitted from the following description. In the case of the third embodiment, the chassis 108 has one window 151 formed therein. This window 151 has a cross mark carved therein. A stand 152 has also a cross mark carved therein and is revolvable around the base 106 along the periphery of the base 106.

A window 161 is provided in the camera-mount support post 102. A disk 162 has a cross mark carved therein and is mounted on the rotation shaft of the camera mount 101 to rotate along with a camera head. The disk 162, which has a knurled periphery, is arranged to be rotatable alone around the rotation shaft of the camera mount 101 along the camera mount 101.

An example of use of the panhead device according to the third embodiment is next described.

The disk 162 and the stand 152 are rotated beforehand by the operator to set them in desired positions. In manually operating the panhead device after that, the camera mount 101 can be manually tilted to a position where the cross mark of the disk 162 and the cross mark of the window 161 of the camera-mount support post 102 come to coincide with each other. The camera mount 101 is likewise manually panned to a position where the cross mark of the stand 152 and the cross mark of the window 151 of the chassis 108 come to coincide with each other.

According to the panhead device of the third embodiment described above, a desired rotating position can be marked to permit a manual operation to be accurately carried out up to the marked position.

While the foregoing description of the second and third embodiments has omitted description about an angle detecting mechanism, the second and third embodiments include the same mechanism as the angle detecting mechanism in the first embodiment.

According to the embodiments described above, when torque having a magnitude greater than a predetermined value other than the power from the driving mechanism of the panhead device is applied to the panhead device, the driving power is cut off by a slippage caused at the clutch means. This arrangement permits a manual operation on the panhead device in addition to the motor-driven operation on the body of the panhead device. The provision of the clutch means also serves to effectively prevent imposition of any excessive load, for safety of the panhead device, even when the panhead device happens to be prevented from acting by some impediment. Further, in driving the panhead device by the driving mechanism, its driving action can be very accurately controlled with the driving amount of the driving mechanism detected by a driving amount detecting means.

Another advantage of the embodiments described above lies in that control information can be retained even in the event of a manual operation. The control information stored enables an action to begin immediately after the power supply is switched on without obtaining a control datum position every time. The operability of the panhead device thus can be enhanced by virtue of the control information stored.

According to the arrangement of the embodiments described above, a specific position or a desired position can be discriminated from other positions in driving and rotating the panhead device. Therefore, the position of the camera mount is accurately controllable without difficulty in driving the panhead device. Further, since the specific or desired position is either distinguishable by a feeling of operation or visually distinguishable, the operator is enabled to appositely and accurately obtain information on the position of the camera mount, thereby attaining a high degree of usability.

What is claimed is:

1. A panhead device comprising:
   a) a base;
   b) a support mount which is movably supported by said base to place a camera thereon;
   c) driving means for driving said support mount in at least one of a panning direction and a tilting direction;
   d) control means for controlling said driving means to cause said support mount to be moved in a predetermined direction;
   e) clutch means, disposed inside said driving means, for transmitting and blocking a driving force; and
   f) position discriminating means for discriminating a specific position of said support mount from other positions of said support mount, said position discriminating means includes a member having a recessed part and a protruding member and determines as said specific position a position where said protruding member engages said recessed part, wherein engagement between said recessed part and said protruding member is enabled only when said support mount is manually moved, and is disabled when said support mount is moved by said driving means.

2. A panhead device according to claim 1, wherein said driving means includes a first driving mechanism for driving said support mount in the panning direction.

3. A panhead device according to claim 2, wherein said clutch means is disposed inside said first driving mechanism.

4. A panhead device according to claim 3, wherein said clutch means causes slippage when torque having a magnitude greater than a predetermined value is applied thereto.

5. A panhead device according to claim 2, further comprising detecting means for detecting a position of said support mount in the panning direction.

6. A panhead device according to claim 5, wherein said detecting means detects a position of said support mount relative to said base.

7. A panhead device according to claim 6, wherein said detecting means includes a first detecting device which performs detection with a first resolution and a second detecting device which performs detection with a second resolution less than the first resolution.

8. A panhead device according to claim 7, wherein said first detecting device includes a mark formed on said base for performing detection with the first resolution.

9. A panhead device according to claim 7, wherein said second detecting device is an encoder.

10. A panhead device according to claim 1, wherein said driving means includes a first driving mechanism for driving said support mount in the panning direction and a second driving mechanism for driving said support mount in the tilting direction.

11. A panhead device according to claim 10, wherein said clutch means is disposed inside said first driving mechanism.

12. A panhead device according to claim 1, further comprising detecting means for detecting a position of said support mount.

13. A device according to claim 12, wherein said detecting means includes a first sensor for detecting a position of said support mount in the panning direction and a second sensor for detecting a position of said support mount in the tilting direction.

14. A panhead device comprising:
   a) a base;
   b) a support mount which is movably supported by said base to place a camera thereon;
   c) driving means for driving said support mount in at least one of a panning direction and a tilting direction;
   d) control means for controlling said driving means to cause said support mount to be moved in a predetermined direction; and
   e) position discriminating means for discriminating a specific position of said support mount from other positions of said support mount, said position discriminating means includes a member having a recessed part and a protruding member and determines as said specific position a position where said protruding member engages said recessed part, wherein engagement between said recessed part and said protruding member is enabled only when said support mount is manually moved, and is disabled when said support mount is moved by said driving means.

* * * * *